United States Patent
Witters

(10) Patent No.: US 12,430,455 B2
(45) Date of Patent: Sep. 30, 2025

(54) SECURE DATA DELIVERY SYSTEM USING AN AUTONOMOUS VEHICLE

(71) Applicant: GM Cruise Holdings LLC, San Francisco, CA (US)

(72) Inventor: David Witters, Westchester, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 384 days.

(21) Appl. No.: 18/054,775

(22) Filed: Nov. 11, 2022

(65) Prior Publication Data
US 2024/0160756 A1 May 16, 2024

(51) Int. Cl.
*G06F 21/62* (2013.01)
*G06F 21/55* (2013.01)

(52) U.S. Cl.
CPC ........ *G06F 21/6209* (2013.01); *G06F 21/554* (2013.01); *G06F 2221/034* (2013.01)

(58) Field of Classification Search
CPC ............... G06F 21/6209; G06F 21/554; G06F 221/034; G06F 21/31; G06F 21/88; G06F 2221/034; G07C 9/00563; G07C 9/00912; G07C 9/37; G05D 1/0287; G08G 1/0112; G08G 1/012; G08G 1/0129; G08G 1/0141; G08G 1/052; G08G 1/20; G08G 1/141; G08G 1/142; G08G 1/143; G08G 1/146
See application file for complete search history.

(56) References Cited

U.S. PATENT DOCUMENTS

| | | | |
|---|---|---|---|
| 10,635,642 B1* | 4/2020 | Haggerty | G06F 21/6218 |
| 10,812,996 B2 | 10/2020 | Tavares Coutinho et al. | |
| 11,753,040 B1* | 9/2023 | Gammelgard | G09B 9/052 701/2 |
| 2002/0171546 A1* | 11/2002 | Evans | G06F 21/554 340/568.1 |
| 2015/0382169 A1* | 12/2015 | Burba | G06Q 10/107 455/11.1 |
| 2019/0337526 A1* | 11/2019 | Rave | G06F 21/554 |
| 2020/0074061 A1* | 3/2020 | Kim | H04L 9/0891 |
| 2020/0139932 A1* | 5/2020 | Wood | H04L 9/3247 |
| 2021/0097201 A1* | 4/2021 | Wasicek | G06F 21/32 |
| 2022/0198375 A1* | 6/2022 | Eger | G01C 21/3438 |
| 2024/0140491 A1* | 5/2024 | Laverne | B60W 60/00256 |

* cited by examiner

*Primary Examiner* — Ryan J Jakovac
(74) *Attorney, Agent, or Firm* — Honigman LLP; Matthew H. Szalach; Jonathan P. O'Brien

(57) ABSTRACT

Examples of the present disclosure provide a system for secure data delivery, the system comprising: an autonomous vehicle including a data courier; data exceeding a predetermined threshold size, the data provided in an encrypted data structure secured by a digital key; and instructions for routing the data, the instructions including a location of a receiver and a route for routing the autonomous vehicle. The autonomous vehicle is configured to receive and deliver the data in a parked state, and the data courier comprises: a wired interface configured to receive the data by a wired connection, a data store configured to store the data and the instructions temporarily until the data is delivered; a security module configured to prevent unauthorized access to the data while stored in the data store; and a tamper detector configured to detect tampering of the data while stored in the data store.

20 Claims, 8 Drawing Sheets

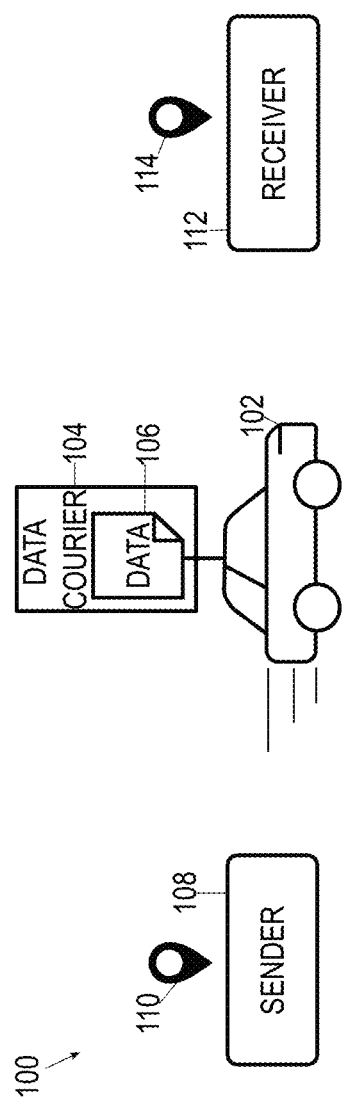

SECURE DATA DELIVERY SYSTEM USING AN AUTONOMOUS VEHICLE

BACKGROUND

1. Technical Field

The present disclosure generally relates to data communication methods and systems and, more specifically, to a secure data delivery system using an autonomous vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, among others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. To facilitate this description, like reference numerals designate like structural elements. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1 illustrates a simplified block diagram of an example secure data delivery system using an autonomous vehicle, according to some examples of the present disclosure;

DETAILED DESCRIPTION

Figures 2A, 2B:
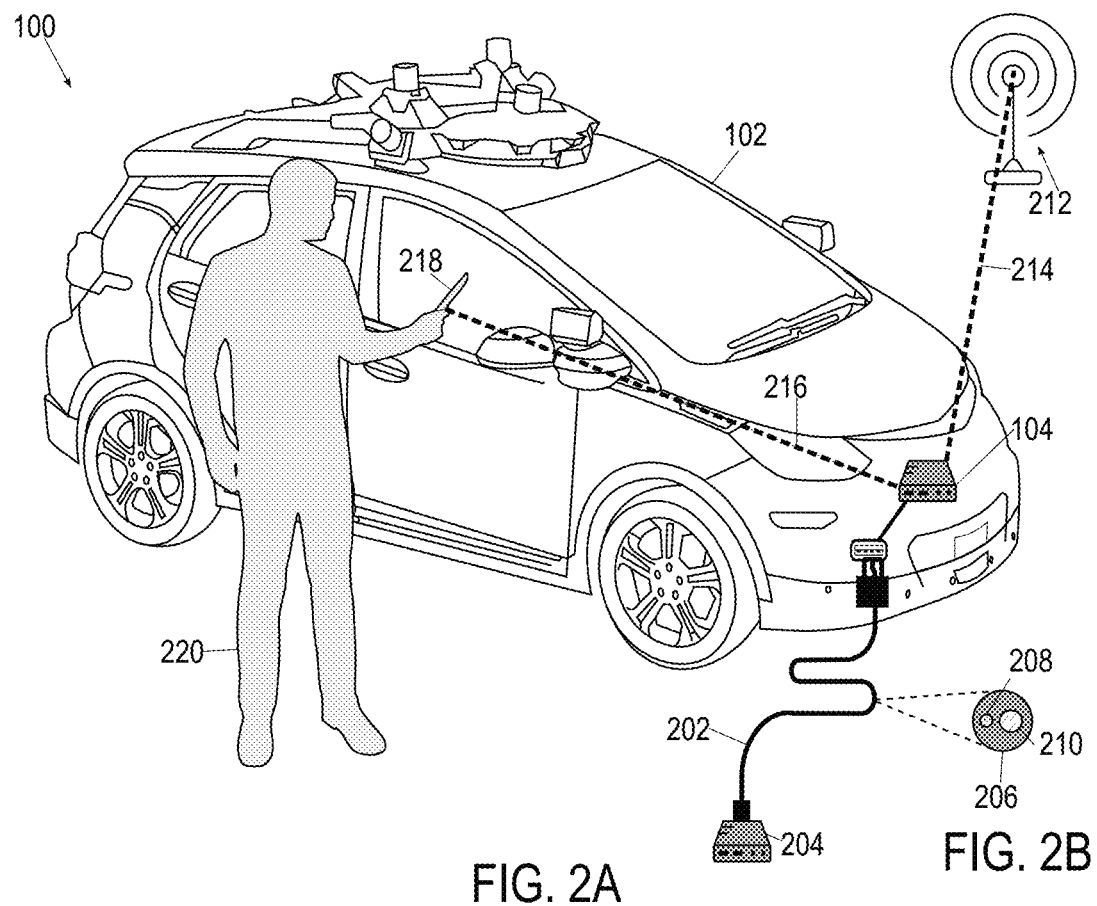
FIG. 2A illustrates a simplified perspective view of various modes of data communication with a secure data delivery system using an autonomous vehicle, according to some examples of the present disclosure.
FIG. 2B illustrates a simplified cross-sectional detail in the secure data delivery system of FIG. 2A.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

An autonomous vehicle contains within it many integrated circuit (IC) devices such as microprocessors, microcontrollers, and the like. These IC devices perform various functions that serve to allow the autonomous vehicle to operate without a human driver or with little human assistance. This absence of a human presence in the autonomous vehicle allows the autonomous vehicle to be used as a "robot" essentially performing tasks much like an automated machine in an industrial setting. Unlike the automated machine, however, the autonomous vehicle is mobile and can be suitably used to transport goods, people, and data from one point to another in urban and other settings.

Accordingly, examples of the present disclosure provide a system for secure data delivery using an autonomous vehicle. The autonomous vehicle includes a data courier, and data exceeding a predetermined threshold size in some examples. The data may be provided in an encrypted data structure secured by a digital key. The data may include instructions for routing the data, the instructions including a location of a receiver and a route for routing the autonomous vehicle. The autonomous vehicle may be configured to receive and deliver the data in a parked state (as opposed to a moving state). In various examples, the data courier includes a communication interface configured to receive the data (e.g., by a wired connection, wireless connection, etc.), a data store configured to store the data and the instructions temporarily until the data is delivered; a security module configured to prevent unauthorized access to the data while stored in the data store; and a tamper detector configured to detect tampering of the data while stored in the data store.

In another aspect of the present disclosure, the data store may be provided in a storage device of the autonomous vehicle. In some examples, the data store may be configured to store data larger than 1 Terabyte. The tamper detector may be configured to detect tampering of the data stored in the data store. The data courier may further include a security module configured to prevent unauthorized access to the data stored in the data store. The data courier may also include a status monitor to detect whether the autonomous vehicle is in a parked state.

In yet another aspect of the present disclosure, a method is provided for secure data delivery by the autonomous vehicle. The method comprises: while an autonomous vehicle is in a parked state at a first location: receiving data from a sender; ensuring security of the data by encrypting the data; determining whether route instructions have been received; if route instructions have not been received, requesting route instructions; verifying route information in the route instructions; and programming an expected route of the autonomous vehicle according to the route instructions from the first location to a second location; driving the autonomous vehicle according to the expected route from the first location to the second location; monitoring an actual route of the autonomous vehicle; and while the autonomous vehicle is in a parked state at the second location: authenticating a receiver of the data; if the receiver is authenticated, delivering the data to the receiver; and if the receiver is not authenticated, not delivering the data to the receiver.

In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life manufacturing limitations which may cause the features to not look so "ideal" when any of the structures described herein are examined minutely. Note that in the figures, various components are shown as aligned merely for ease of illustration; in actuality, some or all of them may be misaligned. Further, the figures are intended to show relative arrangements of the components within their assemblies, and, in general, such assemblies may include other components that are not illustrated (e.g., various other components related to electrical functionality, or thermal mitigation). For example, in some further examples, the assembly as shown in the figures may include more electrical or thermomechanical components. Additionally, although some components of the assemblies are illustrated in the figures as being planar rectangles or formed of rectangular solids, this is simply for ease of illustration, and examples of these assemblies may be curved, rounded, or otherwise irregularly shaped as dictated by and sometimes inevitable due to the manufacturing processes used to make various components.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 112a-112e), such a collection may be referred to herein without the letters (e.g., as "112").

FIG. 1 illustrates a simplified block diagram of an example system 100 for secure data delivery using an autonomous vehicle 102. Autonomous vehicle 102 comprises a data courier 104. Data courier 104 may comprise a hardware module in autonomous vehicle 102 configured with instructions and components to facilitate secure data delivery of data 106 by autonomous vehicle 102 from a sender 108 at a location 110 to a receiver 112 at a location 114. Data courier 104 may include storage devices, processors, memory elements, and various other modules and components that enable various functions as described further herein. Data 106 comprises data generated outside autonomous vehicle 102. Data 106 does not include any data that is generated by autonomous vehicle 102, such as sensor data or traffic data. Data 106 may include any other type of data, including text, images, videos, binary executable code, source code, and/or operations code generated by a source external to autonomous vehicle 102. Examples of data 106 include movies, digital images (such as of original artwork with provenance and/or non-fungible token information), stock and/or other financial data, etc. Data 106 may be independent of autonomous vehicle 102 entirely, in that autonomous vehicle 102 may not need the contents of data 106 for any operations whatsoever in or by autonomous vehicle 102. However, in some examples, data 106 may be enveloped with other information and data structures that may contain instructions and/or other information that may be used by autonomous vehicle 102 to perform data courier functions as described further herein.

Autonomous vehicle 102 offers a secure "last mile" delivery of overly large data sets, for example, exceeding 1 Terabyte in size. In some examples, autonomous vehicle 102 may be used for secure data delivery specifically where data 106 exceeds a predetermined threshold size, for example, 1 Terabyte. In another example, autonomous vehicle 102 offers secure digital delivery of sensitive, or nonpublic files, for example, post-production content, between agencies and post-houses (e.g., a dedicated shop that production companies and filmmakers use for post-production projects). Due to the absence of a human driver inside autonomous vehicle 102, data 106 may be transported between locations 110 and 114 without any human contact, potentially reducing the risk of a human-caused data leak and/or hacking. System 100 thus provides a backbone free data delivery service in areas with limited to no connectivity, limited bandwidth, or in situations where transporting data over communications networks is fraught with risks of data leak and/or hacking.

In another example, autonomous vehicle 102 can be used to deliver a secret or an encryption key. In some such embodiments, autonomous vehicle 102 may be parked at location 110. Autonomous vehicle 102 may generate an encryption key comprising data 106. The encryption key may be configured to encrypt some sensitive data. Autonomous vehicle 102 may receive the sensitive data, encrypt the sensitive data using the encryption key, send the encrypted sensitive data to the cloud (e.g., a communications network that is not implemented within the chassis of autonomous vehicle 102), and deliver data 106 comprising only the encryption key to receiver 112. Receiver 112 may use the encryption key in data 106 to decrypt the sensitive data in the cloud.

In another example, a first autonomous vehicle 102 (e.g., 102(1)) may send the sensitive data to a second autonomous vehicle 102 (e.g., 102(2)). The encryption key may comprise data 106 for the first autonomous vehicle 102(1) and the sensitive data may comprise data 106 for the second autonomous vehicle 102(2). In such examples, if the first (or the second) autonomous vehicle 102 is stolen or tampered with, the other autonomous vehicle 102 (i.e., the second (or the first)) may ensure that the sensitive data is not compromised.

In some examples, location 110 may not be stationary. For example, location 110 may comprise another autonomous vehicle that is moving relative to autonomous vehicle 102. Data 106 may be transmitted from the other autonomous vehicle to autonomous vehicle 102 by wireless means. In some such examples, autonomous vehicle 102 may also be moving relative to a stationary location, and the data transfer may occur from one autonomous vehicle to another while both are in motion. In some such examples, the transmission of data 106 between the autonomous vehicles may operate similar to a relay, with the data transfer occurring after secure encryption keys have been exchanged and identities of the autonomous vehicles verified appropriately.

Note that although autonomous vehicle 102 is depicted as a car in the figure, such is merely for illustrative ease and is not meant to be a limitation. Autonomous vehicle 102 can include any unmanned vehicle capable of moving from one location to another using autonomous self-driving capabilities as described further herein. In some examples, autonomous vehicle 102 may comprise a car; in other examples, autonomous vehicle 102 may comprise a van or sports utility vehicle (SUV); in yet other examples, autonomous vehicle 102 may comprise an aerial vehicle, such as a drone, glider, helicopter, or aircraft.

FIG. 2A is a simplified perspective and block view of various parts of system 100 for secure data delivery. Autonomous vehicle 102 may comprise data courier 104. In the figure, a symbolic representation of data courier 104 as a box located toward a front of autonomous vehicle 102 is merely for ease of illustration. In various examples, data courier 104 may be distributed across various different components of autonomous vehicle 102. Data 106 may be transferred to data courier 104 by various means, including wired connections and wireless connections.

In one example, data 106 may be received by autonomous vehicle 102 through a wired connection 202 from a data source 204. Data source 204 may function as sender 108 in the example. Data source 204 may comprise a hard disk drive in some examples. The hard disk drive may be part of a server, a computer, a laptop, a notepad, or other digital device. In some examples, wired connection 202 may comprise a charging cable 206, as shown in greater detail in cross-section view in FIG. 2B. For example, autonomous vehicle 102 may be connected to a charging station (not shown) by charging cable 206. Charging cable 206 may comprise more than one wires therein. At least one wire 208 may be configured to transfer digital data. At least another wire 210 may be configured to deliver power from the charging station to autonomous vehicle 102. Note that only two wires are shown in charging cable 206 for ease of illustration. Any number of wires may be provisioned in charging cable 206 suitably without departing from the scope of the present disclosure.

In another example, data 106 may be received by autonomous vehicle 102 from an antenna 212 through a wireless microwave connection 214 for microwave radiation having a frequency between 1 GHz and 1000 GHz and data link rates in a range between 300 Mbps and 1 Gbps. Antenna 212 may function as sender 108 in the example. In such examples, there may be a clear line of sight between antenna 212 and a corresponding antenna (not shown with particularity) in autonomous vehicle 102 before or during data transfer of data 106 to data courier 104. Other modes of transferring data 106 to data courier 104 in autonomous vehicle 102 include a BLUETOOTH® or Wi-Fi connection 216 from a phone or other handheld device 218, which functions as sender 108. In some examples, a person 220 may manually initiate data transfer over wireless (or wired) connections as appropriate and based on particular needs. Note that the frequency ranges of BLUETOOTH® and Wi-Fi communication are according to industry standards, for example, between 2.402 GHz and 2.48 GHz and between 900 MHz and 60 GHz respectively.

Figure 3:
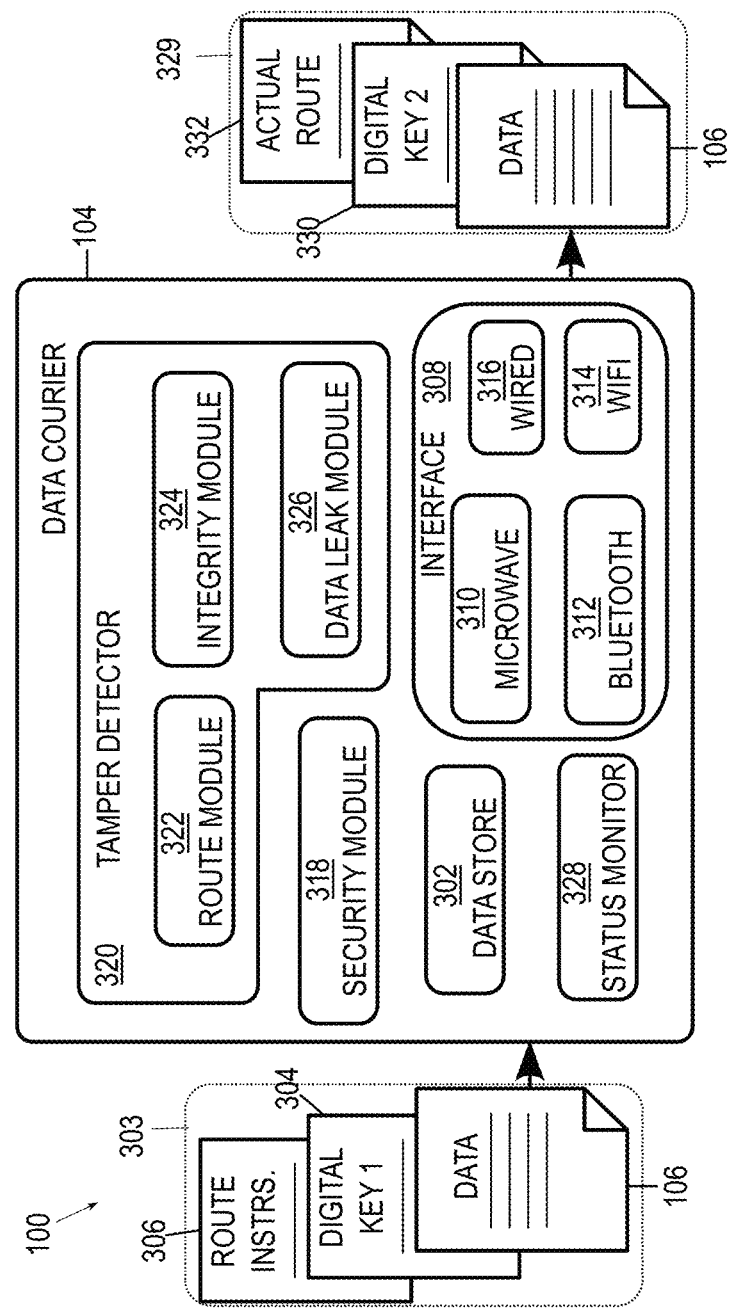
FIG. 3 illustrates a simplified block diagram of components of a secure data delivery system using an autonomous vehicle, according to some examples of the present disclosure.

FIG. 3 is a simplified block diagram of system 100 for secure data delivery using autonomous vehicle 102, showing certain details of data courier 104 and related components. Data courier 104 may include a data store 302 configured for storing data 106. In some examples, because data 106 is of large size (e.g., greater than 1 Terabyte), data store 302 may be configured to store such large sized data suitably. In some other examples where data 106 is not of large size (e.g., smaller than 1 Terabyte), data store 302 may not be configured for storing large sized data. In some examples, data store 302 may comprise distributed data storage devices located across an internal local area network at different locations within autonomous vehicle 102. For example, such distributed data store 302 may comprise a hard disk drive of an on-board computer located toward a rear of autonomous vehicle 102, a memory device in a microprocessor or controller located toward a front of autonomous vehicle 102, an external disk drive attached to the chassis in a trunk portion of autonomous vehicle 102, etc. In some such examples, data 106 may be stored in a distributed manner, and/or periodically moved between the distributed storage locations within autonomous vehicle 102.

In some examples, data store 302 may be configured to store data 106 temporarily until delivery to receiver 112, after which data 106 may be automatically deleted permanently. In some examples, data store 302 may be irremovably (e.g., permanently) fixed to autonomous vehicle 102 so that it cannot be removed therefrom. Examples of permanent fixtures include locking data store 302 into a safe-deposit box welded to the chassis of autonomous vehicle 102; providing a lockable box with an alarm or appropriate message (e.g., to sender 108 and/or receiver 112) that sounds if data store 302 is removed from the lockable box; providing a location for data store 302 under the hood of autonomous vehicle that is not easily accessed without damaging other parts; various other mechanisms may be encompassed in the broad scope of the disclosure herein. Data 106 may be transferred to data courier 104 in a data structure 303 secured by a digital key 304 (e.g., digital key 1). Data structure 303 may further include route instructions 306. Digital key 304 may be further to encrypt data 106 suitably and to authenticate autonomous vehicle 102. Route instructions 306 may be for routing data 106, including location 114 of receiver 112 and a route for routing the autonomous vehicle 102 between sender 108 and receiver 112.

Data courier 104 may further comprise an interface 308 for communication with sender 108 and receiver 112. Interface 308 may comprise physical interfaces (e.g., antenna, ports, etc.) and electrical/software interfaces such as a microwave interface 310, for example, to communicate using microwave communication over wireless connection 214 with antenna 212. Interface 308 may include BLUETOOTH® interface 312 and WI-FI interface 314 for such types of wireless communication 216. Interface 308 may include a wired interface 316 for wired connection 202. Note that other interfaces for other types of communication modes may be provided in interface 308 without departing from the scope of the disclosure. Interface 308 may comprise various hardware (e.g., buses) and software (e.g., protocols) for various communication channels used to transfer data 106 to and from data courier 104.

Data courier 104 may further comprise a security module 318 configured to prevent unauthorized access to data 106 while stored in data store 302. For example, security module 318 may include instructions to encrypt data 106 suitably; access to data 106 may be allowed only by proper authentication and authorization procedures; various other means known in the art to ensure data security may be implemented by security module 318.

Data courier 104 may further include a tamper detector 320 configured to detect tampering of data 106 while stored in data store 302. Tamper detector 320 may include route module 322 configured to monitor a route traversed by autonomous vehicle 102 between sender 108 and receiver 112, an integrity module 324 configured to monitor a physical integrity of data store 302, and a data leak module 326 configured to monitor access to data 106 in data store 302. In some examples, route module 322 may check whether the route traversed by autonomous vehicle 102 has significantly diverged from an expected route for the autonomous vehicle 102 (suggesting an unauthorized takeover of the autonomous vehicle 102 with a possible risk of data leak and/or tampering). In some examples, integrity module 324 may flag any damage to data store 302 while data 106 is stored in data store 302. The flag may identify attempts at tampering data store 302, such as removal from autonomous vehicle 102, destruction (e.g., in an accident) or acts of vandalism. Data leak module 326 may flag any unauthorized delivery of data 106 (e.g., to receivers other than authorized receiver 112, copying of data 106, or read commands to read data 106, etc.) when autonomous vehicle 102 is in motion.

In some examples, sensor data from various sensors in autonomous vehicle 102 may be used to detect and/or prevent tampering of data 106. In some examples, if an unexpected event occurs (e.g., unexpected relative to instructions received with data 106), different levels of precautions may be taken, such as moving data 106 within a local area network within autonomous vehicle 102, encrypting data 106 with additional security keys, wiping data 106, etc. In some such examples, the different levels of precaution can correspond to various events, such as a first level for an unexpected detour (e.g., a blocked road, an accident, etc.), a second level for detecting a person purposely blocking autonomous vehicle 102, a third level for a person trying to enter autonomous vehicle 102, a fourth level for a person entering autonomous vehicle 102, etc. In some other examples, if the sensors detect that autonomous vehicle 102 is being towed (e.g., by sensing lifting of autonomous vehicle 102, or by identifying a tow truck), data 106 may be wiped (and/or other security measures taken according to instructions provided with data 106).

Data courier 104 further comprises a status monitor 328 configured to determine whether autonomous vehicle 102 is in a parked state. Data courier 104 may include instructions to prevent receipt or delivery of data 106 when autonomous vehicle 102 is in motion. In various embodiments, data 106 may be delivered to receiver 112 in a data structure 329 that is different from data structure 303. Data structure 329 may include data 106, another digital key 330 and an actual route 332 traversed by autonomous vehicle 102 from sender 108 to receiver 112. Digital key 330 may be used to authenticate receiver 112 suitably. Data structure 329 may also include flags if any generated by the route module 322, integrity module 324, and data leak module 326.

Figure 4:
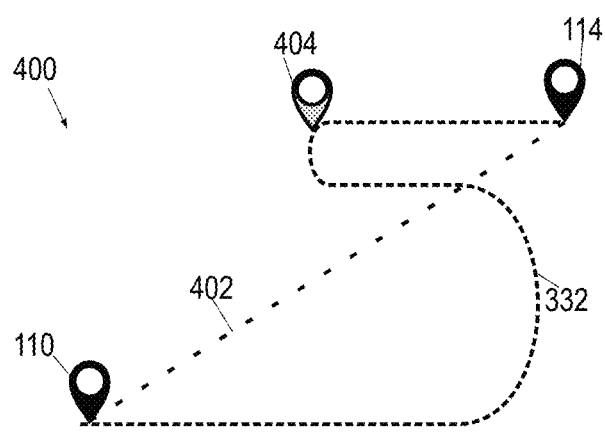
FIG. 4 illustrates a simplified schematic diagram of example route monitoring in a secure data delivery system using an autonomous vehicle, according to some examples of the present disclosure.

FIG. 4 is a simplified diagram showing routes associated with data 106 according to various examples of the present disclosure. An expected route 402 of autonomous vehicle 102 between location 110 of sender 108 and location 114 of receiver 112 may be provided to data courier 104. Data courier 104 may verify the route information of expected route 402, for example, by comparing expected route 402 to one or more maps stored in autonomous vehicle 102, determining that expected route 402 is navigable according to the one or more maps, accessing traffic or roadblock information available to autonomous vehicle 102, and determining that there is no traffic or roadblock along expected route 402. Such verification actions may be performed when autonomous vehicle 102 is in a parked state.

In an example, autonomous vehicle 102 may deviate from expected route 402 to stop at location 404. The reason for the deviation may be non-malicious, such as deviation due to an unexpected road block, loss of power to autonomous vehicle 102, an accident, etc.; or malicious, such as deliberate attempts to access data 106. Any deviations from expected route 402 may be flagged by route module 322 of FIG. 3, for example, by monitoring actual route 332, and comparing with expected route 402. The flags may be presented to receiver 112 who may then perform further analysis to determine the reason for the deviation. In some examples, autonomous vehicle 102 may adjust actual route 332 based on vehicle, road and/or environmental conditions (e.g., autonomous vehicle 102 may not be able to make a turn at an expected location because of temporary roadwork, etc.) but as long as the changed actual route 332 does not deviate from expected route 402 beyond a predetermined threshold, autonomous vehicle 102 may not take any corrective action, such as wiping data 106. For example, if the new route is within a threshold distance (e.g., within 1 mile) and/or direction of the old route, or actual route 332 is within a threshold distance and/or direction of expected route 402, then no corrective action may be taken. In another example, if the reroute is not based on another vehicle or person (e.g., not based on a car cutting autonomous vehicle 102 off, or a person blocking a turn, etc.), then corrective action may not be taken.

Figure 5:
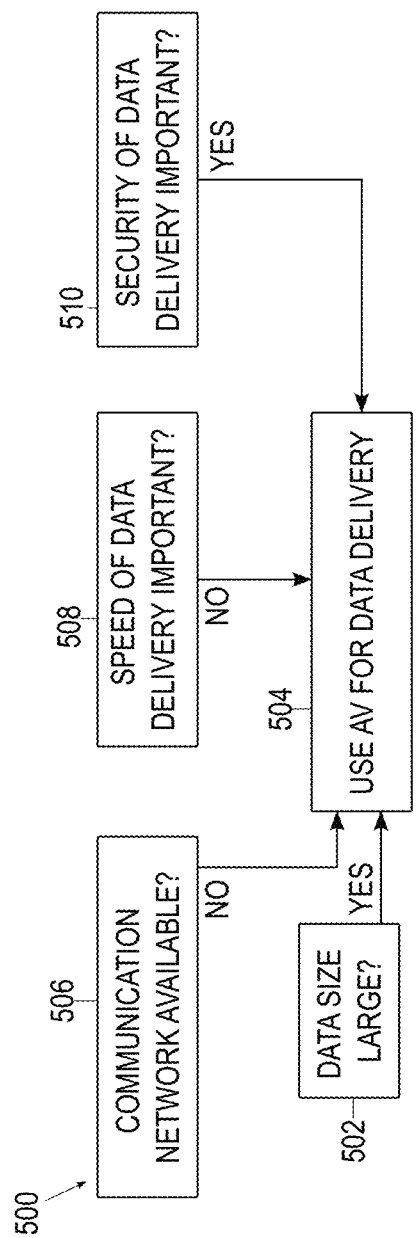
FIG. 5 illustrates simplified decision tree used in a secure data delivery system using an autonomous vehicle, according to some examples of the present disclosure.

FIG. 5 is a simplified block diagram illustrating a decision tree and/or various factors 500 used to select autonomous vehicle 102 for delivery of data 106. Factor 502 is the size of data 106 for decision 504 to use autonomous vehicle 102 for data delivery. If data 106 is less than 1 Terabyte, autonomous vehicle 102 may not be selected for data delivery and other means may be used. If data 106 is larger than 1 Terabyte, autonomous vehicle 102 may be used for data delivery.

Factor 506 is lack of availability of an alternate communication network. An alternate communication network may be simply unavailable (e.g., due to the nature of the location), inaccessible (e.g., due to lack of network credentials), or prohibitively expensive to access (e.g., very high data transfer rates) in various examples. If a suitable communication network is not available for transferring data 106 between sender 108 and receiver 112, or if the communication network available has lower bandwidth than is acceptable, decision 504 to use autonomous vehicle 102 may be adopted. In some examples, system 100 using autonomous vehicle 102 with data courier 104 may provide a "sneaker net" for secure and safe data delivery that can operate in areas without Internet or other types of connectivity to a larger network.

Factor 508 concerns the acceptability of slow speed of data delivery compared with a communication network. Data delivery using autonomous vehicle 102 is considerably slower than over the Internet through which data is delivered at high speeds. Indeed, data delivery speed using autonomous vehicle 102 may depend on road and traffic conditions, weather, and other factors that are not applicable to data delivery over traditional communication networks. If such slow and unpredictable data speeds are not significant to sender 108 and/or receiver 112, decision 504 to use autonomous vehicle 102 may be adopted.

Factor 510 is security of the data during transit between sender 108 and receiver 112. Autonomous vehicle 102 offers data security that is more stringent than traditional communication network because of the ability to isolate data 106 from any communication network. Although autonomous vehicle 102 is necessarily connected to a communication network for purposes of navigation and vehicle control (among other reasons), data store 302 may be disconnected in some examples from such network when autonomous vehicle 102 is in motion, thereby reducing any risks of data hacking over the communication network. In another example, autonomous vehicle 102 may operate on two separate and distinct networks, one of which is "clean" (i.e., trusted) and another which is "dirty" (i.e., permits user interface). Data 106 may be transferred only on the clean network and communication on the dirty network may be prohibited. Thus, system 100 using autonomous vehicle 102 for secure data delivery may be more advantageous than traditional communication networks. In addition, the lack of a human driver (or passenger) during data delivery may prevent unauthorized access to data 106, unauthorized copying, tampering etc., enhancing security of data 106 during transit.

Figure 6:
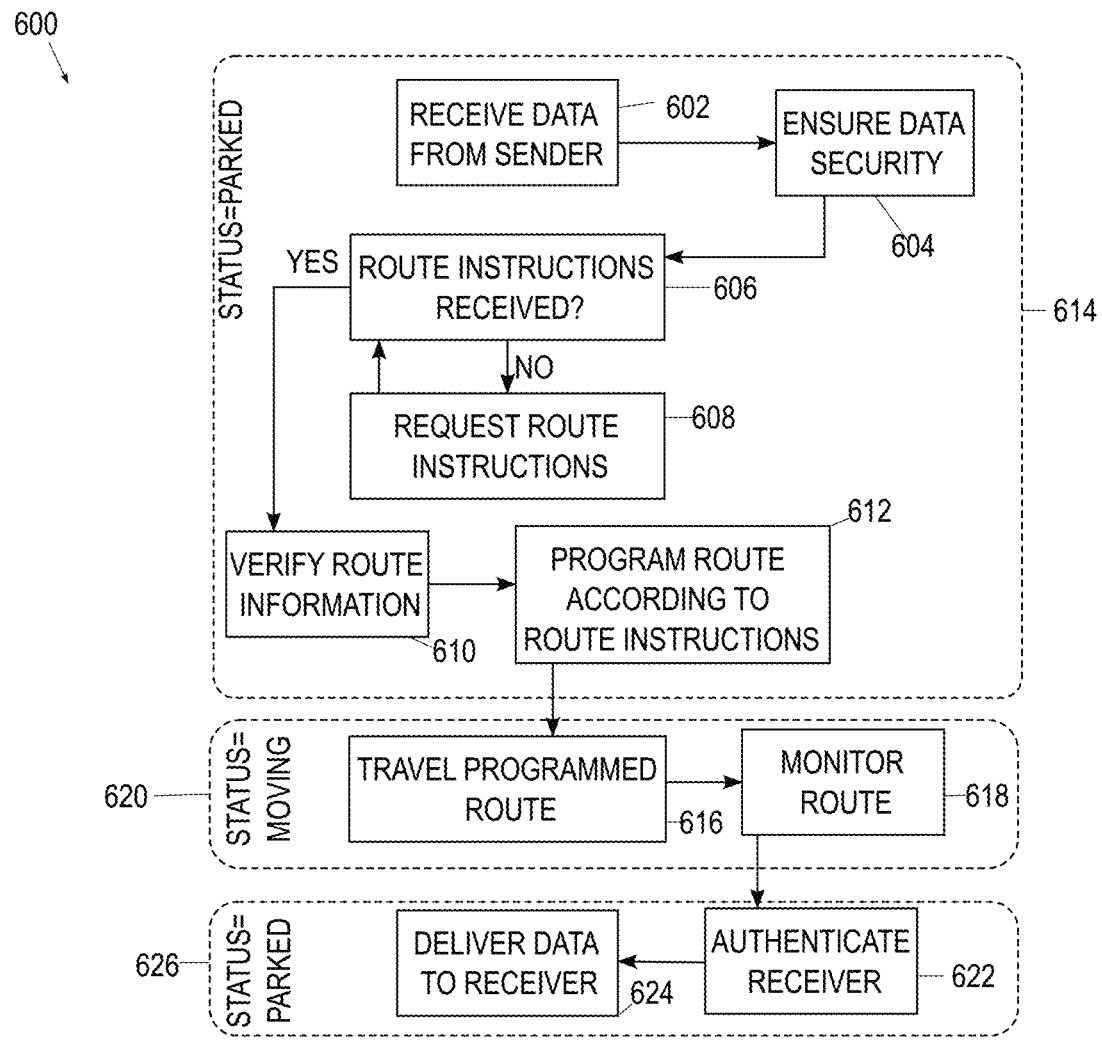
FIG. 6 is a simplified flow diagram illustrating example operations that may be associated with a secure data delivery system using an autonomous vehicle, according to some examples of the present disclosure.

FIG. 6 is a simplified flow diagram illustrating example operations 600 for secure data delivery using autonomous vehicle 102 according to various examples as described herein. At 602, data 106 may be received from sender 108 by interface 308. At 604, data security module 318 may ensure data security by appropriate authentication of the sender and encryption of data 106 before storing data 106 in data store 302. In one example, sender 108 may be authenticated at the time of data transfer with a picture/video of the surroundings, and/or scan of the surroundings with LIDAR/RADAR using sensors of autonomous vehicle 102 sensors and sending the pictures/video/data to an authentication service to check whether autonomous vehicle 102 is indeed at sender location 110. The authentication service may analyze the picture/video can be analyzed for signage to confirm location; signature scans may be analyzed for matching with a signature of sender 108. In another example where data transfer is through a charging cable, the cable may have an identifier specific to sender location 110 (e.g., checking against a manifest).

In yet another example, a person may need to come and plug in the charging cable or approach autonomous vehicle 102 in order for the wired/wireless data transfer to begin. The person can be prompted/required to perform a specific gesture at autonomous vehicle 102, which may be configured suitably to identify the person and/or gesture using LIDAR, cameras, etc. In another example, the identity of the person performing the manual transfer can be scanned (e.g., to confirm certain features of the person), or a mobile phone of the person is checked to authenticate the person (e.g., BLUETOOTH MAC address). In some other examples, biometrics such as eye, fingerprint, face scanning may be used for authentication.

At 606, a determination may be made by data store 302 whether route instructions 306 have been received. If route instructions 306 have not been received, at 608, route instructions 306 may be requested appropriately from sender 108. In some examples, route instructions 306 may include only location 114 of receiver 112, in which case autonomous vehicle 102 may determine expected route by itself (for example, using available maps and other information). In some other examples, route instructions 306 may be provided by sender 108, in which case autonomous vehicle 102 may store the information in data store 302 appropriately.

At 610, data courier 104 may verify the route information in route instructions 306. If, at 606, it is determined that route instructions 306 are received, the operations may step to 610. In various examples, verifying route information at 610 may comprise comparing an expected route in route instructions 306 to one or more maps stored in autonomous vehicle 102, determining that the expected route is navigable according to the one or more maps, accessing traffic or roadblock information available to autonomous vehicle 102, and determining that there is no traffic or roadblock along the expected route. At 612, after verifying route information, autonomous vehicle 102 may be programmed to traverse the expected route according to route instructions 306. Operations 602 to 612, collated in operation 614, may be performed when autonomous vehicle 102 is in a parked state.

At 616, autonomous vehicle 102 may travel the programmed route. In some examples, the programmed route may change en route based on road conditions, malicious tampering, etc. In yet other examples, the programmed route may not change. At 618, route module 322 may monitor actual route 332 traversed by autonomous vehicle 102, and compare actual route 332 against the expected route provided in route instructions 306. Operations 616 and 618, collated into operation 620, may be performed while autonomous vehicle 102 is in motion.

At 622, autonomous vehicle 102 may arrive at destination location 114, and authenticate receiver 112. Authentication of receiver 112 may be by exchange of digital security keys, and other means known in the art. Other mechanisms for authentication are similar as for sender 108 and as described in previous paragraphs. If receiver 112 is not authenticated, data 106 may not be delivered to receiver 112. At 624, data 106, including flags, actual route 332, etc. may be delivered to receiver 112. Operations 622 and 624 are collated into operation 626, performed while autonomous vehicle 102 is in a parked state.

Figure 7:
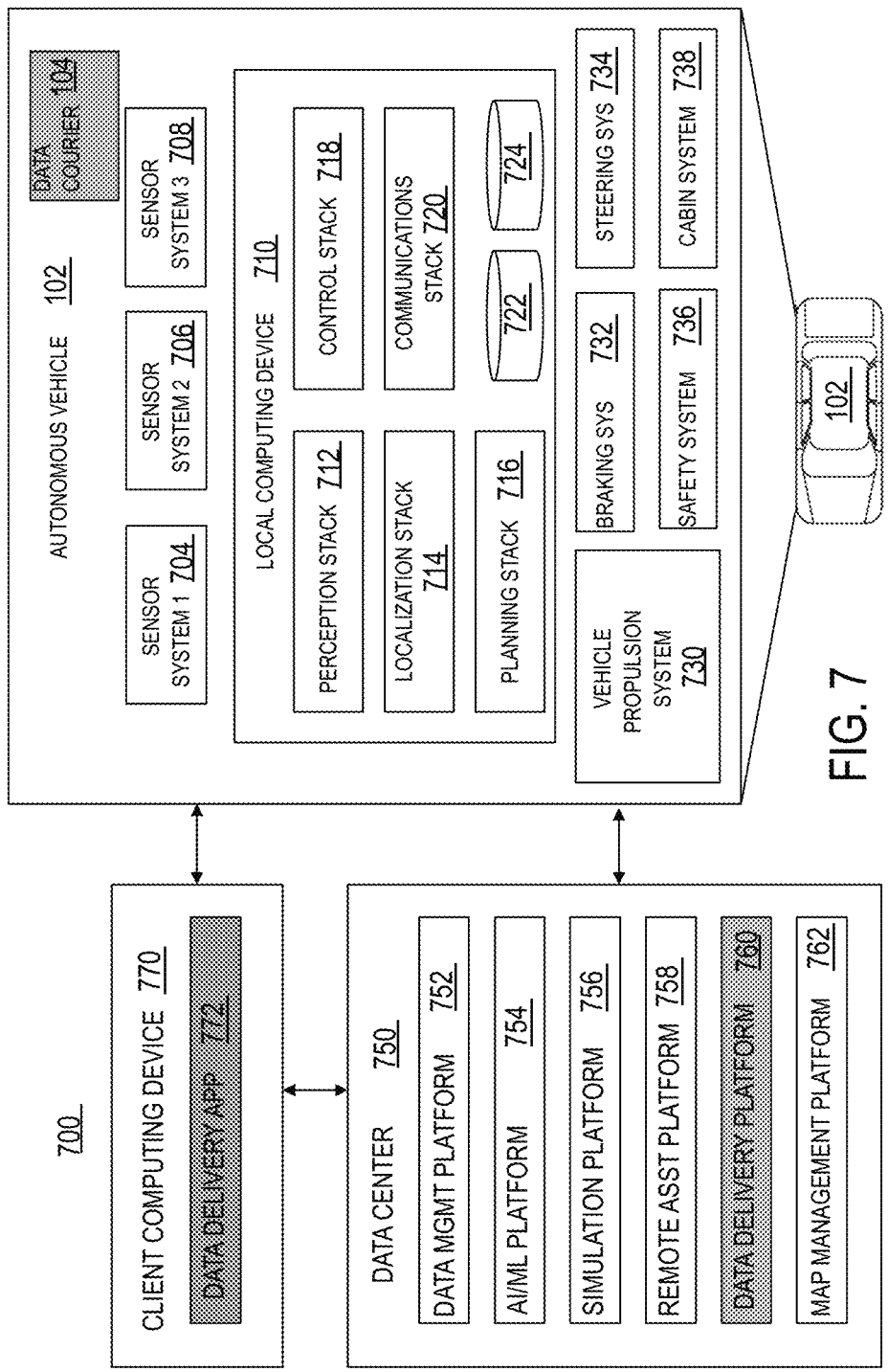
FIG. 7 illustrates an example system environment that can be used to facilitate autonomous vehicle dispatch and operations, according to some aspects of the disclosed technology.

FIG. 7 illustrates an example of an autonomous vehicle management system 700. One of ordinary skill in the art will understand that, for the autonomous vehicle management system 700 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the autonomous vehicle management system 700 includes autonomous vehicle 102, a data center 750, and a client computing device 770. Autonomous vehicle 102, the data center 750, and the client computing device 770 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

Autonomous vehicle 102 can navigate about roadways without a human driver based on sensor signals generated by multiple sensor systems 704, 706, and 708. The sensor systems 704-708 can include different types of sensors and can be arranged about autonomous vehicle 102. For instance, the sensor systems 704-708 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 704 can be a camera system, the sensor system 706 can be a LIDAR system, and the sensor system 708 can be a RADAR system. Other examples may include any other number and type of sensors.

AV 102 can also include several mechanical systems that can be used to maneuver or operate autonomous vehicle 102. For instance, the mechanical systems can include vehicle propulsion system 730, braking system 732, steering system 734, safety system 736, and cabin system 738, among other systems. Vehicle propulsion system 730 can include an electric motor, an internal combustion engine, or both. The braking system 732 can include an engine brake, a wheel braking system (e.g., a disc braking system that utilizes brake pads), hydraulics, actuators, and/or any other suitable componentry configured to assist in decelerating autonomous vehicle 102. The steering system 734 can include suitable componentry configured to control the direction of movement of autonomous vehicle 102 during navigation. Safety system 736 can include lights and signal indicators, a parking brake, airbags, and so forth. The cabin system 738 can include cabin temperature control systems, in-cabin entertainment systems, and so forth. In some examples, autonomous vehicle 102 may not include human driver actuators (e.g., steering wheel, handbrake, foot brake pedal, foot accelerator pedal, turn signal lever, window wipers, etc.) for controlling autonomous vehicle 102. Instead, the cabin system 738 can include one or more client interfaces (e.g., Graphical User Interfaces (GUIs), Voice User Interfaces (VUIs), etc.) for controlling certain aspects of the mechanical systems 730-738.

Autonomous vehicle 102 can additionally include a local computing device 710 that is in communication with the sensor systems 704-708, the mechanical systems 730-738, the data center 750, and the client computing device 770, among other systems. The local computing device 710 can include one or more processors and memory, including instructions that can be executed by the one or more processors. The instructions can make up one or more software stacks or components responsible for controlling autonomous vehicle 102; communicating with the data center 750, the client computing device 770, and other systems; receiving inputs from riders, passengers, and other entities within the autonomous vehicle's environment; logging metrics collected by the sensor systems 704-708; and so forth. In this example, the local computing device 710 includes a perception stack 712 a mapping and localization stack 714, a planning stack 716, a control stack 718, a communications stack 720, a High Definition (HD) geospatial database 722, and an autonomous vehicle operational database 724, among other stacks and systems.

Perception stack 712 can enable autonomous vehicle 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 704-708, the mapping and localization stack 714, the HD geospatial database 722, other components of autonomous vehicle 102, and other data sources (e.g., the data center 750, the client computing device 770, third-party data sources, etc.). The perception stack 712 can detect and classify objects and determine their current and predicted locations, speeds, directions, and the like. In addition, the perception stack 712 can determine the free space around autonomous vehicle 102 (e.g., to maintain a safe distance from other objects, change lanes, park the autonomous vehicle, etc.). The perception stack 712 can also identify environmental uncertainties, such as where to look for moving objects, flag areas that may be obscured or blocked from view, and so forth.

Mapping and localization stack 714 can determine the autonomous vehicle's position and orientation (pose) using different methods from multiple systems (e.g., GPS, IMUs, cameras, LIDAR, RADAR, ultrasonic sensors, the HD geospatial database 722, etc.). For example, in some examples, autonomous vehicle 102 can compare sensor data captured in real-time by the sensor systems 404-408 to data in the HD geospatial database 722 to determine its precise (e.g., accurate to the order of a few centimeters or less) position and orientation. Autonomous vehicle 102 can focus its search based on sensor data from one or more first sensor systems (e.g., GPS) by matching sensor data from one or more second sensor systems (e.g., LIDAR). If the mapping and localization information from one system is unavailable, autonomous vehicle 102 can use mapping and localization information from a redundant system and/or from remote data sources.

The planning stack 716 can determine how to maneuver or operate autonomous vehicle 102 safely and efficiently in its environment. For example, the planning stack 716 can receive the location, speed, and direction of autonomous vehicle 102, geospatial data, data regarding objects sharing the road with autonomous vehicle 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing autonomous vehicle 102 from one point to another. The planning stack 716 can determine multiple sets of one or more mechanical operations that autonomous vehicle 102 can perform (e.g., go straight at a specified speed or rate of acceleration, including maintaining the same speed or decelerating; power on the left blinker, decelerate if autonomous vehicle is above a threshold range for turning, and turn left; power on the right blinker, accelerate if autonomous vehicle is stopped or below the threshold range for turning, and turn right; decelerate until completely stopped and reverse; etc.), and select the best one to meet changing road conditions and events. If something unexpected happens, the planning stack 716 can select from multiple backup plans to carry out. For example, while preparing to change lanes to turn right at an intersection, another vehicle may aggressively cut into the destination lane, making the lane change unsafe. The planning stack 716 could have already determined an alternative plan for such an event, and upon its occurrence, help to direct autonomous vehicle 102 to go around the block instead of blocking a current lane while waiting for an opening to change lanes.

The control stack 718 can manage the operation of the vehicle propulsion system 730, the braking system 732, the steering system 734, the safety system 736, and the cabin system 738. The control stack 718 can receive sensor signals from the sensor systems 704-708 as well as communicate with other stacks or components of the local computing device 710 or a remote system (e.g., the data center 750) to effectuate operation of autonomous vehicle 102. For example, the control stack 718 can implement the final path or actions from the multiple paths or actions provided by the planning stack 716. This can involve turning the routes and decisions from the planning stack 716 into commands for the actuators that control the autonomous vehicle's steering, throttle, brake, and drive unit.

The communication stack 720 can transmit and receive signals between the various stacks and other components of autonomous vehicle 102 and between autonomous vehicle 102, the data center 750, the client computing device 770, and other remote systems. The communication stack 720 can enable the local computing device 710 to exchange information remotely over a network, such as through an antenna array or interface that can provide a metropolitan WI-FI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless LAN (WLAN), BLUETOOTH®, infrared, etc.).

The HD geospatial database 722 can store HD maps and related data of the streets upon which autonomous vehicle 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The autonomous vehicle operational database 724 can store raw autonomous vehicle data generated by the sensor systems 404-408 and other components of autonomous vehicle 102 and/or data received by autonomous vehicle 102 from remote systems (e.g., the data center 750, the client computing device 770, etc.). In some examples, the raw autonomous vehicle data can include HD LIDAR point cloud data, image or video data, RADAR data, GPS data, and other sensor data that the data center 450 can use for creating or updating autonomous vehicle geospatial data.

The data center 750 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 750 can include one or more computing devices remote to the local computing device 710 for managing a fleet of autonomous vehicles and autonomous vehicle-related services. For example, in addition to managing autonomous vehicle 102, the data center 450 may also support a data delivery service, a delivery service, a remote/roadside assistance service, street services (e.g., street mapping, street patrol, street cleaning, street metering, parking reservation, etc.), and the like.

The data center 750 can send and receive various signals to and from autonomous vehicle 102 and the client computing device 770. These signals can include sensor data captured by the sensor systems 704-708, roadside assistance requests, software updates, data delivery pick-up and drop-off instructions, and so forth. In this example, the data center 750 includes one or more of a data management platform 752, an Artificial Intelligence/Machine Learning (AI/ML) platform 754, a simulation platform 756, a remote assistance platform 758, a data delivery platform 760, and a map management platform 762, among other systems.

Data management platform 752 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, data delivery service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., autonomous vehicles, enterprise systems, social networks, etc.), data having different rates of change (e.g., batch, streaming, etc.), or data having other heterogeneous characteristics. The various platforms and systems of the data center 750 can access data stored by the data management platform 752 to provide their respective services.

The AI/ML platform 754 can provide the infrastructure for training and evaluating machine learning algorithms for operating autonomous vehicle 102, the simulation platform 756, the remote assistance platform 758, the data delivery platform 760, the map management platform 762, and other platforms and systems. Using the AI/ML platform 754, data scientists can prepare data sets from the data management platform 752; select, design, and train machine learning models; evaluate, refine, and deploy the models; maintain, monitor, and retrain the models; and so on.

The simulation platform 756 can enable testing and validation of the algorithms, machine learning models, neural networks, and other development efforts for autonomous vehicle 102, the remote assistance platform 758, the data delivery platform 760, the map management platform 762, and other platforms and systems. The simulation platform 756 can replicate a variety of driving environments and/or reproduce real-world scenarios from data captured by autonomous vehicle 102, including rendering geospatial information and road infrastructure (e.g., streets, lanes, crosswalks, traffic lights, stop signs, etc.) obtained from the map management platform 762; modeling the behavior of other vehicles, bicycles, pedestrians, and other dynamic elements; simulating inclement weather conditions, different traffic scenarios; and so on.

The remote assistance platform 758 can generate and transmit instructions regarding the operation of autonomous vehicle 102. For example, in response to an output of the AI/ML platform 754 or other system of the data center 750, the remote assistance platform 758 can prepare instructions for one or more stacks or other components of autonomous vehicle 102.

The data delivery platform 760 can interact with a customer of a data delivery service via a data delivery application 772 executing on the client computing device 470. The client computing device 770 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the data delivery application 772. The client computing device 770 can be a customer's mobile computing device or a computing device integrated with autonomous vehicle 102 (e.g., the local computing device 710). The data delivery platform 760 can receive requests for data to be picked up or dropped off from the data delivery application 772 and dispatch autonomous vehicle 102 for the trip.

Map management platform 762 can provide a set of tools for the manipulation and management of geographic and spatial (geospatial) and related attribute data. The data management platform 752 can receive LIDAR point cloud data, image data (e.g., still image, video, etc.), RADAR data, GPS data, and other sensor data (e.g., raw data) from one or more autonomous vehicles 102, Unmanned Aerial Vehicles (UAVs), satellites, third-party mapping services, and other sources of geospatially referenced data. The raw data can be processed, and map management platform 762 can render base representations (e.g., tiles (2D), bounding volumes (3D), etc.) of the autonomous vehicle geospatial data to enable users to view, query, label, edit, and otherwise interact with the data. Map management platform 762 can manage workflows and tasks for operating on the autonomous vehicle geospatial data. Map management platform 762 can control access to the autonomous vehicle geospatial data, including granting or limiting access to the autonomous vehicle geospatial data based on user-based, role-based, group-based, task-based, and other attribute-based access control mechanisms. Map management platform 762 can provide version control for the autonomous vehicle geospatial data, such as to track specific changes that (human or machine) map editors have made to the data and to revert changes when necessary. Map management platform 762 can administer release management of the autonomous vehicle geospatial data, including distributing suitable iterations of the data to different users, computing devices, autonomous vehicles, and other consumers of HD maps. Map management platform 762 can provide analytics regarding the autonomous vehicle geospatial data and related data, such as to generate insights relating to the throughput and quality of mapping tasks. In many embodiments, map management platform 762 may communicate with route module 322 of data courier 104 for assisting the latter with various operations as described in reference to preceding figures.

In some examples, the map viewing services of map management platform 762 can be modularized and deployed as part of one or more of the platforms and systems of the data center 750. For example, the AI/ML platform 754 may incorporate the map viewing services for visualizing the effectiveness of various object detection or object classification models, the simulation platform 756 may incorporate the map viewing services for recreating and visualizing certain driving scenarios, the remote assistance platform 758 may incorporate the map viewing services for replaying traffic incidents to facilitate and coordinate aid, data delivery platform 760 may incorporate the map viewing services into the client application 772 to enable passengers to view autonomous vehicle 102 in transit en route to a pick-up or drop-off location, and so on.

In many examples, data courier 104 may communicate with one or more sensor systems 704-708 in addition to map management platform 762. In some examples, one or more sensor systems 704-708 may be part of data courier 104. Such sensor systems 704-708, may, for example, record any efforts at data tampering, route tampering, data leak, etc. and provide the information to data courier 104, which may use the information to verify data integrity of data 106. In some examples, as described in previous paragraphs, sensor systems 704-708 may record videos and/or take pictures of surroundings of autonomous vehicle 102 during data pick-up from sender location 110. In some examples, data courier 104 may include local computing device 710, for example, to perform one or more operations of data courier 104 as described herein. Data courier 104 may be another portion of autonomous vehicle 102. Other parts of data courier 104 may be comprised appropriately in various components and blocks of the figure although they are not shown or labeled with particularity merely for ease of illustration.

Figure 8:
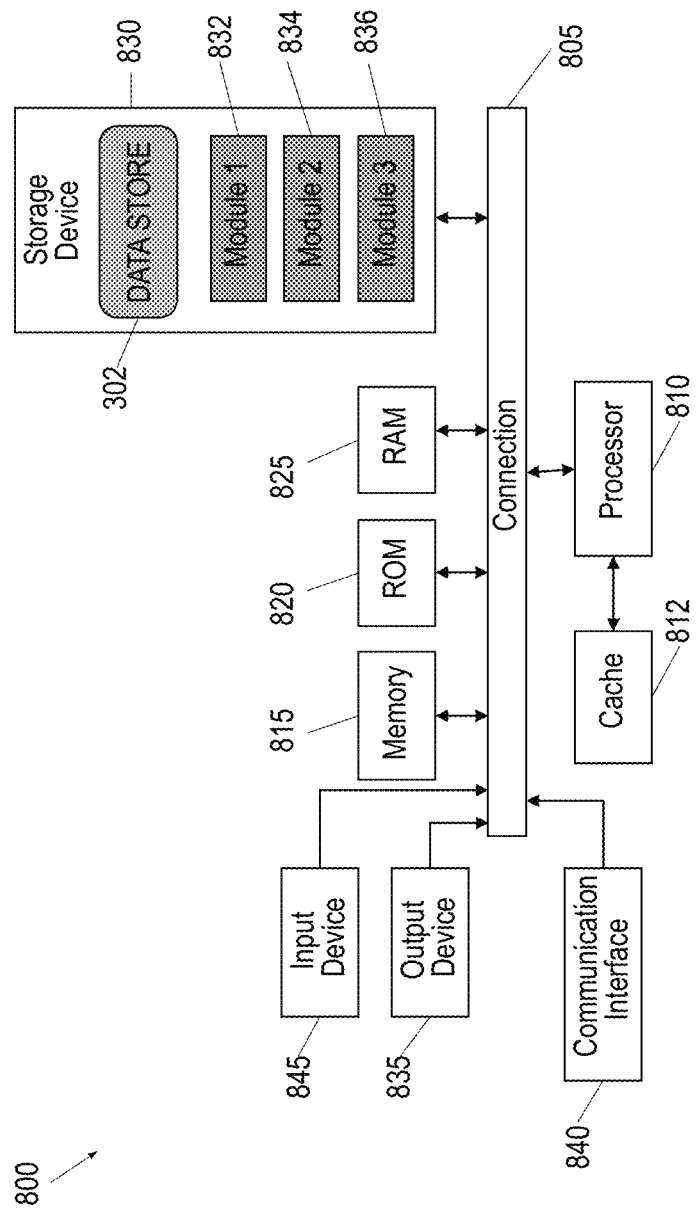
FIG. 8 is a simplified block diagram illustrating various components associated with a secure data delivery system using an autonomous vehicle, according to some examples of the present disclosure.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric. In some examples, various components and modules of data courier 104 may include instructions for execution by processor 810. For example, tamper detector 320 of data courier 104 may comprise to detect tampering of data 106 stored in data store 302. Security module 318 may comprise instructions to prevent unauthorized access to data 106 stored in data store 302. Status monitor 328 may comprise instructions to detect whether autonomous vehicle 102 is in a parked state; and so on.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi™ wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more GNSS receivers or transceivers that are used to determine a location of the computing system 800 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed. In some examples, interface 308 of data courier 104 may be part of communication interface 840.

Storage device 830 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a CD-ROM optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another IC chip/card, RAM, Atatic RAM (SRAM), Dynamic RAM (DRAM), ROM, Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

In many examples, storage device 830 may include data store 302. In some cases, data store 302 may be a physically separate component dedicated for use by data courier 104 and communicatively coupled to other components of storage device 830. In other cases, data store 302 may be a component of storage device 830 that may be used to store information other than data 106. For example, route information, including map data used by map management platform 762 and/or route module 322 may be stored in data store 302. In some examples, data store 302 may also store instructions for execution by various components of data courier 104. In some examples, data store 302 may store sensor data relevant to integrity module 324, data leak module 326; such information may also be stored in other parts of storage device 830 and accessed through data store 302 (or other components) by data courier 104.

Storage device 830 can include software services, servers, services, etc., that when the code that defines such software is executed by the processor 810, it causes the system 800 to perform a function. For example, various components of data courier 104 as described in reference to FIG. 3 may be stored in storage device 830, for example, in various modules 832-836. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general-purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers (PCs), handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a system for secure data delivery (e.g., 100), the system comprising: an autonomous vehicle (e.g., 102) including a data courier (e.g., 104); data (e.g., 106) exceeding a predetermined threshold size, the data provided in an encrypted data structure (e.g., 303) secured by a digital key (e.g., 304); and instructions (e.g., 306) for routing the data, the instructions including a location (e.g., 114) of a receiver (e.g., 112) and a route (e.g., 402) for routing the autonomous vehicle between a sender (e.g., 108) and the receiver; in which, the autonomous vehicle is selected for data delivery based on lack of availability of an alternate communication network, the autonomous vehicle is configured to receive and deliver the data in a parked state, and the data courier includes: a wired interface (e.g., 316) configured to receive the data from the sender by a wired connection (e.g., 202), a data store (e.g., 302) configured to store the data and the instructions temporarily until the data is delivered to the receiver; a security module (e.g., 318) configured to prevent unauthorized access to the data while stored in the data store; and a tamper detector (e.g., 320) configured to detect tampering of the data while stored in the data store.

Example 2 provides the system of example 1, in which the predetermined threshold size is 1 Terabyte.

Example 3 provides the system of any one of examples 1-2, in which the sender includes a hard disk drive (e.g., 212).

Example 4 provides the system of any one of examples 1-3, in which: the wired connection includes one or more signal wires (e.g., 208) in a charging cable (e.g., 206), and the charging cable includes at least another wire (e.g., 210) configured to carry power to charge the autonomous vehicle.

Example 5 provides the system of example 1, in which the data courier further includes a microwave interface (e.g., 310) configured to receive the data from the sender by microwave radiation (e.g., 214) having a frequency between 1 GHz and 1000 GHz.

Example 6 provides the system of example 1, in which the data courier further includes a wireless interface (e.g., 314) configured to receive the data from the sender by WI-FI waves having a frequency between 900 MHz and 60 GHz (e.g., 206).

Example 7 provides the system of example 1, in which the data courier further includes a BLUETOOTH® interface (e.g., 312) configured to receive the data from the sender by BLUETOOTH® radiation having a frequency between 2.402 GHz and 2.48 GHz.

Example 8 provides the system of any one of examples 1-7, in which the data courier further includes a status monitor configured to determine whether the autonomous vehicle is in a parked state.

Example 9 provides the system of any one of examples 1-8, in which the tamper detector includes: a route module (e.g., 322) configured to monitor a route traversed by the autonomous vehicle when the autonomous vehicle is in motion between the sender and the receiver; an integrity module (e.g., 324) configured to monitor a physical integrity of the data store; and a data leak module (e.g., 326) configured to monitor access to the data in the data store.

Example 10 provides the system of any one of examples 1-9, in which: the data is delivered to the receiver in another data structure (e.g., 333), the another data structure includes the data secured by another digital key, and a route (e.g., 332) traversed by the autonomous vehicle from the sender to the receiver.

Example 11 provides the system of any one of examples 1-10, in which: the security module is configured to prevent unauthorized access to the data by encrypting the data using the digital key.

Example 12 provides an autonomous vehicle, comprising: a processor (e.g., 810); a storage device (e.g., 830); a communication interface (e.g., 840); and a data courier (e.g., 104) coupled to the processor, the storage device, and the communication interface, in which: the data courier includes a data store in the storage device, the data store configured to store data larger than 1 Terabyte, the communication interface includes at least a wired interface (e.g., 316) configured to receive the data and provide the data to the data store, and the data courier further includes: a tamper detector (e.g., 320) comprising first instructions for execution by the processor, the first instructions to detect tampering of the data stored in the data store, a security module (e.g., 318) comprising second instructions for execution by the processor, the second instructions to prevent unauthorized access to the data stored in the data store; and a status monitor (e.g., 328) comprising third instructions for execution by the processor, the third instructions to detect whether the autonomous vehicle is in a parked state.

Example 13 provides the autonomous vehicle of example 12, in which the first instructions of the tamper detector further include: route module instructions to continuously monitor and store a route taken by the autonomous vehicle between a sender of the data and a receiver of the data; integrity module instructions to continuously monitor a physical integrity of the data store while the data is stored in the data store; and data leak module instructions to continuously monitor access to the data while the data is stored in the data store.

Example 14 provides the autonomous vehicle of example 13, in which the data courier further includes instructions for execution by the processor, the instructions being to not accept the data and to not deliver the data when the autonomous vehicle is in motion.

Example 15 provides the autonomous vehicle of example 14, in which any delivery of the data when the autonomous vehicle is in motion is flagged according to the data leak module instructions.

Example 16 provides the autonomous vehicle of any one of examples 14-15, in which any damage to the data store while the data is stored in the data store is flagged according to the integrity module instructions.

Example 17 provides the autonomous vehicle of any one of examples 12-16, in which the data is received at the autonomous vehicle in a data structure comprising: the data; a digital key encrypting the data; and route instructions to deliver the data from a sender of the data to a receiver of the data.

Example 18 provides the autonomous vehicle of example 17, in which the route instructions include an expected route to be taken by the autonomous vehicle between the sender and the receiver.

Example 19 provides the autonomous vehicle of example 18, in which: the data structure is a first data structure, the data is delivered by the autonomous vehicle in a second data structure, and the second data structure includes: the data; another digital key encrypting the data; and a route taken by the autonomous vehicle from the sender of the data to the receiver of the data.

Example 20 provides the autonomous vehicle of example 19, in which the route is flagged according to the first instructions if the route deviates from the expected route provided in the route instructions.

Example 21 provides the autonomous vehicle of any one of examples 12-20, in which the data courier is further configured with instructions for execution by the processor, the instructions comprising: receiving the data from a sender; ensuring security of the data in the data store; determining whether route instructions have been received; verifying route information in the route instructions; programming a route of the autonomous vehicle according to the route instructions; authenticating a receiver of the data; and delivering the data to the receiver.

Example 22 provides the autonomous vehicle of example 21, in which verifying route information includes: comparing an expected route in the route instructions to one or more maps stored in the autonomous vehicle; determining that the expected route is navigable according to the one or more maps; accessing traffic or roadblock information available to the autonomous vehicle; and determining that there is no traffic or roadblock along the expected route.

Example 23 provides a method, comprising: while an autonomous vehicle is in a parked state at a first location: receiving data from a sender; ensuring security of the data by encrypting the data; determining whether route instructions have been received; if route instructions have not been received, requesting route instructions; verifying route information in the route instructions; and programming an expected route of the autonomous vehicle according to the route instructions from the first location to a second location; driving the autonomous vehicle according to the expected route from the first location to the second location; monitoring an actual route of the autonomous vehicle; and while the autonomous vehicle is in a parked state at the second location: authenticating a receiver of the data; if the receiver is authenticated, delivering the data to the receiver; and if the receiver is not authenticated, not delivering the data to the receiver.

Example 24 provides the method of example 23, in which the data is received over a wired connection.

Example 25 provides the method of example 24, in which the wired connection includes one or more signal wires in a charging cable, the charging cable comprising at least another wire for delivering power to the autonomous vehicle.

Example 26 provides the method of example 23, in which the data is received over a wireless connection.

Example 27 provides the method of example 26, in which the wireless connection is at least one of the following: a BLUETOOTH® wireless connection, a BLE wireless connection, an IBEACON® wireless connection, a RFID wireless connection, a NFC wireless connection, a DSRC wireless connection, a 802.11 Wi-Fi® wireless connection, a WiMAX connection, a 3G/4G/5G/LTE cellular data network wireless connection, a radio wave connection, or a microwave connection.

Example 28 provides the method of any one of examples 23-27, in which the data is encrypted using digital keys.

Example 29 provides the method of any one of examples 23-28, in which: the data is received in a first data structure; the data is delivered in a second data structure; and the first data structure is different from the second data structure.

Example 30 provides the method of example 29, in which: the first data structure includes the route instructions, a first digital key to authenticate the autonomous vehicle, and the data; and the second data structure includes the actual route, a second digital key to authenticate the receiver, and the data.

Example 31 provides the method of any one of examples 23-30, further comprising: comparing the actual route with the expected route; and flagging any differences between the actual route and the expected route.

Example 32 provides the method of any one of examples 23-31, further comprising: storing the data in a data store; monitoring a physical integrity of the data store while the data is stored in the data store; and monitoring access to the data while the data is stored in the data store.

Example 33 provides the method of any one of examples 23-32, further comprising deleting the data from the data store after delivery of the data to the receiver.

Example 34 provides the system of any one of examples 1-11, in which the data is external to and independent of the autonomous vehicle.

Example 35 provides the system of any one of examples 1-11, in which the autonomous vehicle is selected for data delivery based on acceptability of slow speed of data delivery compared with a communication network.

Example 36 provides the system of any one of examples 1-11, in which the autonomous vehicle is selected for data delivery based on security of the data during transit between the sender and the receiver.

The various examples described above are provided by way of illustration only and should not be construed to limit the scope of the disclosure. For example, the principles herein apply equally to optimization as well as general improvements. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim.

What is claimed is:

1. An autonomous vehicle, comprising:
   memory configured to store data temporarily until the data is delivered to a receiver, and instructions for routing the data, the instructions comprising a location of the receiver and a route for routing the data between the autonomous vehicle and the receiver; and
   a data courier, comprising:
     a first interface configured to receive the data from a user device associated with a passenger of the autonomous vehicle via a wired connection, wherein the data is received in a first encrypted data structure secured by a digital key, the first encrypted data structure comprising the route, a first digital key to authenticate the autonomous vehicle, and the data;
     a security module configured to prevent unauthorized access to the data while stored in the memory;
     a tamper detector configured to detect tampering with the data while stored in the memory; and
     a second interface configured to deliver the data via the route to the receiver, wherein the data is delivered in a second data structure different from the first data structure, and the second data structure comprising an actual route used to deliver the data to the receiver, a second digital key to authenticate the receiver, and the data,
   wherein the autonomous vehicle is configured to receive and deliver the data in a parked state.

2. The autonomous vehicle of claim 1, wherein the data exceeds 1 Terabyte.

3. The autonomous vehicle of claim 1, wherein the wired connection comprises one or more signal wires in a charging cable, the charging cable comprising at least another wire configured to carry power to charge the autonomous vehicle.

4. The autonomous vehicle of claim 1, wherein the data courier further comprises a microwave interface configured to receive the data from the passenger by microwave radiation having a frequency between 1 GHz and 1000 GHz.

5. The autonomous vehicle of claim 1, wherein the data courier further comprises a status monitor configured to determine whether the autonomous vehicle is in the parked state.

6. The autonomous vehicle of claim 1, wherein the tamper detector comprises:
   a route module configured to monitor a route traversed by the autonomous vehicle when the autonomous vehicle is in motion to the receiver;
   an integrity module configured to monitor a physical integrity of the data stored in the memory; and
   a data leak module configured to monitor access to the data in the memory.

7. The autonomous vehicle of claim 1, wherein the security module is configured to prevent unauthorized access to the data by encrypting the data using the first digital key.

8. The autonomous vehicle of claim 1, wherein the tamper detector is also configured to:
   continuously monitor and store a route taken by the autonomous vehicle taken-between a sender of the data and to a receiver; of the data; integrity module instructions te
   continuously monitor a physical integrity of the memory while the data is stored in the memory; and
   continuously monitor access to the data while the data is stored in the memory.

9. The autonomous vehicle of claim 8, wherein the tamper detector is also configured to:
   flag any delivery of the data while the autonomous vehicle is in motion; and
   flag any damage to the memory while the data is stored in the memory.

10. The autonomous vehicle of claim 1, wherein the data courier is configured to:
    ensure ensuring-security of the data in the memory; data store;
    determining whether route instructions have been received;
    verify verifying route information in the route-instructions for routing the data;
    program programming a route of the autonomous vehicle according to the route information; instructions;
    authenticate the authenticating a-receiver of the data; and
    deliver delivering-the data to the receiver.

11. The autonomous vehicle of claim 10, wherein verifying the route information comprises:
    comparing an expected route in the instructions for routing the data to one or more maps stored in the autonomous vehicle;
    determining that the expected route is navigable according to the one or more maps;
    accessing traffic or roadblock information available to the autonomous vehicle; and
    determining that there is no traffic or roadblock along the expected route.

12. A method, comprising:
    while an autonomous vehicle is in a parked state at a first location receiving data from a sender, wherein the data is received in a first encrypted data structure secured by a digital key, the first encrypted data structure comprising a route, a first digital key to authenticate the autonomous vehicle, and the data;
    storing the data in a data store;
    ensuring security of the data by encrypting the data;
    determining whether route instructions have been received;
    if route instructions have not been received, requesting route instructions;
    verifying route information in the route instructions;
    programming an expected route of the autonomous vehicle according to the route instructions from the first location to a second location;
    driving the autonomous vehicle according to the expected route from the first location to the second location;
    monitoring an actual route of the autonomous vehicle; and
    while the autonomous vehicle is in a parked state at the second location, authenticating a receiver of the data;
    if the receiver is authenticated, delivering the data to the receiver, wherein the data is delivered in a second data structure different from the first data structure, the second data structure comprising an actual route used to deliver the data to the receiver, a second digital key to authenticate the receiver, and the data; and
    if the receiver is not authenticated, not delivering the data to the receiver.

13. The method of claim 12, wherein the data is received over a wired connection, and the wired connection comprising one or more signal wires in a charging cable, the charging cable comprising at least another wire for delivering power to the autonomous vehicle.

14. The method of claim 12, further comprising:
comparing the actual route with the expected route;
flagging any differences between the actual route and the expected route;
storing the flagged differences in the data store;
monitoring a physical integrity of the data store while the data is stored in the data store; and
monitoring access to the data while the data is stored in the data store.

15. An autonomous vehicle, comprising:
a processor; and
memory in communication with the processor and storing instructions that, when executed by the processor, cause the processor to:
while the autonomous vehicle is in a parked state at a first location, receive data from a sender, wherein the data is received in a first encrypted data structure secured by a digital key, the first encrypted data structure comprising a route, a first digital key to authenticate the autonomous vehicle, and the data;
store the data in a data store;
ensure security of the data by encrypting the data;
determine whether route instructions have been received;
if route instructions have not been received, request route instructions;
verify route information in the route instructions;
program an expected route of the autonomous vehicle according to the route instructions from the first location to a second location;
drive the autonomous vehicle according to the expected route from the first location to the second location;
monitor an actual route of the autonomous vehicle;
while the autonomous vehicle is in a parked state at the second location, authenticate a receiver of the data;
if the receiver is authenticated, deliver the data to the receiver, wherein the data is delivered in a second data structure different from the first data structure, the second data structure comprising an actual route used to deliver the data to the receiver, a second digital key to authenticate the receiver, and the data; and
if the receiver is not authenticated, do not deliver the data to the receiver.

16. The autonomous vehicle of claim 15, wherein the instructions also cause the processor to:
compare the actual route with the expected route;
flag any differences between the actual route and the expected route;
store the flagged differences in the data store;
monitor a physical integrity of the data store while the data is stored in the data store; and
monitor access to the data while the data is stored in the data store.

17. The autonomous vehicle of claim 15, wherein the instructions also cause the processor to:
continuously monitor and store a route taken by the autonomous vehicle between the sender and the receiver;
continuously monitor a physical integrity of the data store while the data is stored in the data store; and
continuously monitor access to the data while the data is stored in the data store.

18. The autonomous vehicle of claim 17, wherein instructions also cause the processor to:
flag any delivery of the data while the autonomous vehicle is in motion; and
flag any damage to the data store while the data is stored in the data store.

19. The method of claim 12, further comprising:
continuously monitoring and storing a route taken by the autonomous vehicle between the sender and the receiver;
continuously monitoring a physical integrity of the data store while the data is stored in the data store; and
continuously monitoring access to the data while the data is stored in the data store.

20. The method of claim 12, further comprising:
flagging any delivery of the data while the autonomous vehicle is in motion; and
flagging any damage to the data store while the data is stored in the data store.

* * * * *